US011259499B2

(12) United States Patent  
Petersen et al.

(10) Patent No.: US 11,259,499 B2
(45) Date of Patent: Mar. 1, 2022

(54) SYSTEMS AND METHODS FOR FILLING AND FLUSHING ANIMAL FOOTBATHS

(71) Applicant: Specialty Sales, LLC, Fresno, CA (US)

(72) Inventors: Greg Petersen, Fresno, CA (US); Donald Alsup, Fresno, CA (US)

(73) Assignee: Specialty Sales, LLC, Fresno, CA (US)

( * ) Notice: Subject to any disclaimer, the term of this patent is extended or adjusted under 35 U.S.C. 154(b) by 527 days.

(21) Appl. No.: 16/054,475

(22) Filed: Aug. 3, 2018

(65) Prior Publication Data

US 2019/0045744 A1 Feb. 14, 2019

Related U.S. Application Data

(60) Provisional application No. 62/544,810, filed on Aug. 12, 2017.

(51) Int. Cl.
*A01K 13/00* (2006.01)
*A01L 15/00* (2006.01)
*A61D 11/00* (2006.01)

(52) U.S. Cl.
CPC .......... *A01K 13/001* (2013.01); *A01K 13/003* (2013.01); *A01L 15/00* (2013.01); *A61D 11/00* (2013.01)

(58) Field of Classification Search
USPC ........ 119/673, 665, 650, 651, 603, 604, 670
See application file for complete search history.

(56) References Cited

U.S. PATENT DOCUMENTS

| 1,893,482 A | * | 1/1933 | Belt | A61H 33/02 |
| | | | | 261/20 |
| 4,446,590 A | * | 5/1984 | Kirchner, Jr | B44D 3/006 |
| | | | | 134/139 |

(Continued)

FOREIGN PATENT DOCUMENTS

| CN | 202419891 U * | 9/2012 | ............... F24H 1/18 |
| EP | 2163155 | 3/2010 | |

(Continued)

OTHER PUBLICATIONS

Fjeldass, et al, Water footbath, automatic flushing, and disinfection to improve the health of bovine feet, American Dairy Science Association, 2014.

*Primary Examiner* — Andrea M Valenti
(74) *Attorney, Agent, or Firm* — Sierra IP Law, PC; Mark D. Miller

(57) ABSTRACT

The present invention provides improved systems and methods for flushing out animal footbaths at remote locations which do not have a reliable or high pressure water supply. Embodiments of the flushing systems of the present invention preferably include at least one fluid pressurizing pump and one or more large fluid storage tanks which receive water from a source and place it under pressure for use in the system. Embodiments of the flushing systems of the present invention are capable of automatically: taking in water from a low pressure water source; pumping the water into one or more storage tanks to place it under pressure; preventing backflow of the pressurized water; storing the pressurized water until one or more footbaths requires flushing; performing a flushing operation by opening a master valve or a series of valves in parallel; controlling whether the pressurized water remains untreated by flowing through a flush tube or becomes treated with one or more cleaning or disinfecting compounds by flowing through a mixing pipe in communi- (Continued)

cation with one or more chemical tanks, the pressurized water flowing into and flushing out the one or more fouled footbaths; filling the footbaths with fresh disinfecting solution; refilling and re-pressurizing the one or more storage tanks for the next flushing operation; and blowing out any remaining moisture from the system of pipes to reduce bacterial growth and prevent pipe-bursting in freezing weather.

25 Claims, 2 Drawing Sheets

(56) References Cited

U.S. PATENT DOCUMENTS

| | | | |
|---|---|---|---|
| 5,630,379 A | 5/1997 | Gerk et al. | |
| 7,611,393 B2 | 11/2009 | Christensen | |
| 7,798,104 B2 | 9/2010 | Rajkondawar et al. | |
| 7,841,299 B2 | 11/2010 | Gerk et al. | |
| 8,276,545 B2 | 10/2012 | Greeson | |
| 8,347,821 B2 | 1/2013 | Murphy | |
| 2008/0072840 A1* | 3/2008 | Rajkondawar | A61D 11/00 |
| | | | 119/652 |
| 2008/0196674 A1* | 8/2008 | Buck | A01L 15/00 |
| | | | 119/673 |
| 2009/0178626 A1* | 7/2009 | Greeson | A01K 13/003 |
| | | | 119/651 |
| 2009/0223128 A1* | 9/2009 | Kuschak | A01G 31/00 |
| | | | 47/62 N |
| 2012/0037084 A1 | 2/2012 | Thomsen et al. | |
| 2012/0174872 A1 | 7/2012 | Richards | |
| 2012/0198778 A1 | 8/2012 | MacLean et al. | |
| 2013/0098816 A1* | 4/2013 | Elfstrom | C02F 9/00 |
| | | | 210/153 |

FOREIGN PATENT DOCUMENTS

| | | |
|---|---|---|
| GB | 2119622 | 11/1983 |
| NL | 1009895 | 2/2000 |
| NL | 1038562 | 8/2012 |
| WO | WO2016071640 | 5/2016 |
| WO | WO2016128684 | 8/2016 |

* cited by examiner

SYSTEMS AND METHODS FOR FILLING AND FLUSHING ANIMAL FOOTBATHS

FIELD OF THE INVENTION

The present invention relates to systems and methods for filling and flushing out animal footbaths, including without limitation bovine footbaths, using water that is received from a source and then pressurized for use.

BACKGROUND

Dairy farms and cattle ranches are often situated in remote locations where there is no pressurized municipal water supply. The operation must therefore rely on its own pumps to provide water pressure for a wide variety of uses. One of those uses is filling and flushing out large footbaths which the cattle are directed through in order to clean and disinfect their hooves. These footbaths must be flushed on a regular basis in order to remove the dirty or fouled solution and replace it with fresh disinfecting solution. Often, the available water source cannot provide sufficient water pressure to effectively flush out these footbaths, which then require costly and time-consuming manual cleaning.

Therefore, an improved flushing system is needed which can independently create sufficient water pressure to effectively flush out a bovine footbath and replace the fouled solution with fresh disinfecting solution.

SUMMARY OF THE INVENTION

The present invention provides improved systems and methods for flushing out animal footbaths at remote locations which do not have a reliable or high pressure water supply. The flushing system offers significant advancements by providing reliable water under pressure for effectively flushing out animal footbaths, and for replacing the dirty or fouled footbath solution with a fresh solution. Embodiments of the flushing system obviate the need for manual cleaning of the footbath, saving labor and down time for the footbath. It is to be appreciated that the present invention may be adapted for applications other than bovine footbaths, such as flushing footbaths for other large animals such as at a zoo, or other shallow water installations such as those at a theme park.

Embodiments of the flushing systems of the present invention preferably include at least one fluid pressurizing pump and one or more large fluid storage tanks. The size and number of the storage tanks is dependent on the size and number of footbaths to be flushed, and should be sufficient to flush out at least one, if not all such footbaths when completely discharged. A typical system will often be connected to a low-pressure water source, and include a pressurizing pump with a motor capable of pumping water at a high pressure (e.g., up to 100 P.S.I.) which is used to pressurize at least one water storage tank. The storage tanks should be capable of withstanding a high pressure (e.g., 125 P.S.I.) and should have a capacity sufficient to flush out at least one footbath if completely discharged. An exemplary tank may have a capacity of 50 to 250 gallons, and preferably approximately 91 gallons, in order to flush out one footbath. Water is pumped into the storage tank(s), placed under pressure (e.g., up to 125 P.S.I., and preferably approximately 100 P.S.I.), and held until a flushing operation is needed. The flushing system may prevent backflow of pressurized water from the storage tank(s) to the water source via a one-way check valve.

In some embodiments, multiple storage tanks may be provided in series, all of them being pressurized by the same pump, to provide additional capacity to flush out additional footbaths during such a discharge. In alternative embodiments, multiple tanks may be provided in parallel, each of which may hold a certain volume of pressurized water, with each tank being capable of being discharged independently of the others for controlled flushing (e.g. to flush out only one of many footbaths).

When a flushing is required, a typical embodiment of the present invention may release the pressurized water (e.g., at 100 P.S.I.) from the storage tank(s) via a master valve. During a flushing operation, the entire capacity of the storage tank(s) is ordinarily discharged through either (1) sent directly to the footbath(s) through a flush pipe, or (2) sent through a mixing pipe (venturi tube) where one or more cleaning or disinfecting compounds are added to the water via one or more chemical valves before being directed into the footbaths. The pressurized storage tank(s) may supply pressurized water in a volume sufficient to flush out the footbaths. The flushing system may include one or more pressure relief valves to prevent buildup of pressure beyond a high threshold (e.g., 110 P.S.I.). During a single flushing, pressurized water may first be directed through the flush pipe in order to flush out fouled water from the footbaths, and then a flush valve may be closed, directing the remaining water from the pressurized storage tank through a mixing pipe (e.g., a Venturi tube) to be treated, providing fresh disinfecting solution in the footbath(s). Once the flushing operation is completed, the storage tank(s) may again be filled with water which is placed under pressure, awaiting the next flushing operation.

For flushing system embodiments including multiple footbaths, one footbath may require flushing while another footbath remains clean or is not in use. The flushing system of the present invention may thus be operable to direct the pressurized water into a single footbath, or multiple footbaths, or change from one footbath to another during a flushing via one or more directing valves, the directing valve(s) being located downstream of the flush pipe and mixing pipe.

Embodiments of the flushing system may also include a pressurized air source, such as an air compressor, with a pressure regulator and an air valve for controlling the release of pressurized air (e.g., at 30 P.S.I.) into the system of pipes, the pressurized air source having a capacity sufficient to blow out any moisture remaining in the system of pipes after a flushing operation, reducing bacterial growth in the pipes and preventing the pipes from bursting in freezing temperatures.

It is to be appreciated that the pressurizing pump(s) and all of the valves—including the master valve, the flush valve, the chemical valves, the directing valve(s), and the air valve—of embodiments of the present invention may be computer controlled, and that flow and pressure sensors may be placed in the pipes to allow a system controller to monitor the status of the system before, during and after flushing operations. Typically, each of the valves referred to herein are automatically controlled via at least one solenoid or other device which enables programmable and automatic opening, closing, or adjustment of valves. The system controller may be capable of: automatically turning on the pressurizing pump to build up water pressure in the water storage tank initially or after a flushing operation; shutting off the pressurizing pump upon the pressure in the storage tanks reaching a threshold value; automatically opening the master valve at the beginning of a flushing operation and closing it once the storage tank has completely discharged; automatically opening and closing multiple discharge valves for embodiments where multiple pressurized tanks are provided in parallel; controlling the flush valve to alter the flow of water from the flush pipe to the mixing pipe, and back again; controlling the chemical valves to add disinfecting or cleaning compounds to the flow of water through the mixing pipe; controlling the directing valve(s) to alter the flow of water from one footbath to another, or to multiple footbaths at once; and/or controlling the air valve to blow out moisture from the pipes of the system after a flushing operation. The pressurizing pump(s) and each of the valves of the system may also include a handle or switch, and be operable manually.

It is also to be appreciated that there may be variations in the different components of the system including without limitation the strength and number of pressurizing pumps, the size and number of storage tanks, the size and number of footbaths, the amount of pressure to be built up in the storage tanks, the type, number and order of chemicals to be introduced into the mixture, etc.

Embodiments of the flushing system may thus be capable of automatically: taking in water from a low pressure water source; pumping the water at a high pressure into one or more pressurized storage tanks; preventing backflow of the pressurized water; storing the pressurized water until one or more footbaths requires flushing; performing a flushing operation by opening a master valve or a series of valves in parallel; controlling whether the pressurized water remains untreated by flowing through a flush tube or becomes treated with one or more cleaning or disinfecting compounds by flowing through a mixing pipe in communication with one or more chemical tanks, the pressurized water flowing into and flushing out the one or more fouled footbaths; filling the footbaths with fresh disinfecting solution; refilling and re-pressurizing the one or more storage tanks for the next flushing operation; and blowing out any remaining moisture from the system of pipes to reduce bacterial growth and prevent pipe-bursting.

In one embodiment, the flushing system may comprise: a water pipe connected to a water source; a pressurizing pump for pumping water from the water source and putting the water under pressure; a check valve for preventing backflow of the pressurized water; a water pressure gauge for measuring water pressure in the water pipe; at least one water storage tank for storing water under pressure; a pump controller for controlling the pressure setting of the pressurizing pump; a pressure relief valve for relieving pressure in the flushing system when the water pressure in the water pipe reaches an upper threshold; a master valve for releasing water from the one or more storage tanks during a flushing operation; a flush valve for allowing or preventing the flow of water into a flush pipe for directing the water flow directly to one or more footbaths; a mixing pipe positioned to be an alternative route from the flush pipe, the mixing pipe having at least one valve-controlled input from at least one chemical source for adding at least one disinfecting or cleaning compound to the water flow; at least one chemical tank for storing a plurality of disinfecting or cleaning compounds, each tank being in communication with a chemical valve leading to an input on the mixing pipe; at least one directing valve for directing water into one or more footbaths of the at least one footbath; an air valve in communication with a compressed air source, the compressed air source having a pressure regulator for controlling the air pressure at the air valve; an air check valve for preventing backflow of water into the air valve; and at least one chemical check valve for preventing backflow of water into the at least one chemical valve.

In another embodiment, the flushing system may comprise: a water pipe connected to a water source, at least one pressurizing pump for pumping water from the water source and putting the water under pressure; a check valve for preventing backflow of the pressurized water; at least one water pressure gauge for measuring water pressure in the water pipe; a plurality of water storage tanks for storing pressurized water; at least one pressure relief valve for relieving pressure in the flushing system when the water pressure in the water pipe reaches an upper threshold; a master valve for releasing water from the plurality of storage tanks during a flushing operation; a flush valve for directing the water flow to either a flush pipe or a mixing pipe; the flush pipe directing the water flow directly to at least one footbath, and the mixing pipe having at least one chemical valve for adding at least one disinfecting or cleaning compound to the water flow; at least one chemical tank for storing the at least one disinfecting or cleaning compound, the at least one chemical tank being in communication with the at least one chemical valve; an air valve in communication with a compressed air source, the compressed air source having a pressure regulator for controlling the air pressure at the air valve; at least one directing valve for directing water into one or more footbaths of the at least one footbath; at least one optional flow sensor for monitoring the water flow in at least one of the water pipe, the flush pipe, and the mixing pipe; an air check valve for preventing backflow of water into the air valve; at least one chemical check valve for preventing backflow of water into the at least one chemical valve; and a system controller for receiving signals from the at least one pressure gauge and the at least one optional flow sensor, and controlling the pressurizing pump and each of the master valve, the flush valve, the at least one chemical valve, the air valve, and the at least one directing valve.

Without limiting the invention, an embodiment of a system controller may comprise a user interface and a central processing unit in electronic communication with each of the at least one pressurizing pump, the at least one pressure gauge, the at least one optional flow sensor, the master valve, the flush valve, the at least one chemical valve, the at least one directing valve, and the air valve. The system controller may be capable of: receiving a pressure signal from the at least one pressure gauge; receiving a flow signal from the at least one flow sensor (if used); receiving a position signal from each of the master valve, the flush valve, the at least one chemical valve, the at least one directing valve, and the air valve; determining whether any such pressure signal, optional flow signal, or position signal is outside of the parameters set via the user interface; and if so, taking a corrective action based on the signal. The corrective action may comprise at least one of: sending a command to the pressurizing pump to turn on, shut off, or alter the pressure setting; sending a command to the master valve to open or close; sending a command to the flush valve to alter position; sending a command to the at least one chemical valve to open or close; sending a command to the at least one directing valve to alter position; sending a command to the air valve to open or close; and/or sending a warning signal to the user interface.

In some embodiments, the user interface may be utilized by a user to select a pressure setting, control the number and amount of disinfecting and cleaning compounds to be added to the water flow via the at least one chemical valve, initiate a flushing operation via the master valve, control the position and timing of adjustments to the flush valve, control the position and timing of adjustments to the one or more directing valves, and blow out moisture from the flushing system via the air valve. In some embodiments, the system controller may include a timer and be operable to be set to initiate a flushing operation at a specified time of day or on a regular interval. In some embodiments, the system controller may comprise a wireless communication module. In some embodiments, the system controller may be in electronic communication with a remote computing device (e.g., a personal computer or a cellular device), such that a user may interface with the system controller remotely.

In some embodiments, the system controller may be in electronic communication with the at least one pressurizing pump, the at least one pressure gauge, the at least one optional flow sensor, the master valve, the flush valve, the at least one chemical valve, the at least one directing valve, the air valve, and the remote computing device via wires. In other embodiments, each of the at least one pressurizing pump, the at least one pressure gauge, the at least one optional flow sensor, the master valve, the flush valve, the at least one chemical valve, the at least one directing valve, the air valve, and the remote computing device may comprise a wireless communication module, and be connected to the system controller wirelessly. In yet other embodiments, the flushing system may comprise at least one wired electronic connection and at least one wireless electronic connection between system controller and the at least one pressurizing pump, the at least one pressure gauge, the at least one optional flow sensor, the master valve, the flush valve, the at least one chemical valve, the at least one directing valve, the air valve, and the remote computing device. The wireless electronic connections may comprise at least one of a Wi-Fi connection, a Bluetooth connection, an RF connection, a WLAN connection, and the like.

Without limiting the invention, embodiments of the water pipe may be made of a metal (e.g., steel, copper, or the like), a rubber, or a plastic (e.g., PVC), and may comprise a plurality of sections. In some embodiments, the water pipe may provide fluid communication between: 1) at least one water source (e.g., a well, lake, or river) and the pressurizing pump; 2) the pressurizing pump and the water storage tank; 3) the water storage tank and the master valve: and 4) the master valve and the flush valve. In some embodiments, the water pipe may comprise a garden or landscaping hose between the water source and the pressurizing pump, a metal plumbing pipe between the pressurizing pump and the water storage tank, and a PVC pipe in all other areas.

Embodiments of the pressurizing pump may comprise a water pump and a motor. In some embodiments, the motor may be a 120 volt A/C electric motor, the electric motor being in electronic communication with a 120 volt A/C power source. In other embodiments, the motor may be an internal combustion motor. In some embodiments, the water pump may be a 3-stage centrifugal pump capable of creating up to 100 P.S.I. of water pressure in the water pipe. In other embodiments, the water pump may be a turbine pump. In some embodiments, the pressurizing pump may be in electronic communication with and be controlled by the pump controller. In other embodiments, the pressurizing pump may be in electronic communication with and be controlled by the system controller. In yet other embodiments, the pressurizing pump may be controlled manually. In some embodiments, the flushing system may comprise a plurality of pressurizing pumps.

In some embodiments, the check valve may be a one-way brass valve with a ball-cone-spring configuration capable of allowing water to flow from the pressurizing pump to the water storage tank, but not in the reverse direction. In other embodiments, the check valve may comprise a one-way valve comprising at least one of brass, steel, or PVC. In some embodiments, the air check valve preventing backflow of water into the air valve, and the chemical check valve(s) preventing backflow of water into the at least one chemical valve may also be one-way brass valves with a ball-cone-spring configuration.

In some embodiments, the water pressure gauge may be a P.S.I. gauge capable of reading and displaying water pressure within in a range (e.g., from 0 P.S.I. to 150 P.S.I.). In some embodiments, the water pressure gauge may be in electronic communication with, and be capable of sending a water pressure signal to, the system controller. In some embodiments, the flushing system may include a plurality of water pressure gauges located on at least one of the water pipe, flush pipe, and mixing pipe, and each being in electronic communication with, and able to send a water pressure signal to, the system controller.

In some embodiments, the at least one optional flow sensor may be an electronic water flow sensor with a rotor capable of measuring the flow of water through at least one of the water pipe, flush pipe, and mixing pipe. In some embodiments, the at least one optional flow sensor may be in electronic communication with, and be capable of sending a flow signal to, the system controller. In some embodiments, the at least one optional flow sensor may comprise a visual display for displaying a flow rate. In some embodiments, the at least one optional flow sensor may comprise a plurality of flow sensors, each in a different location on at least one of the water pipe, flush pipe, and mixing pipe.

In some embodiments, the water storage tank may comprise a pressurized water storage accumulator with a capacity ranging from 50 to 250 gallons, and preferably ranging from 91 to 119 gallons. In some embodiments, the water storage tank may be capable of storing water at a maximum pressure of up to 125 P.S.I. In other embodiments, the water storage tank may have a maximum pressure of up to 150 P.S.I. In some embodiments, the flushing system may comprise a plurality of water storage tanks. In some embodiments, each of the plurality of water storage tanks may be in fluid communication with a different pressurizing pump of the plurality of pressuring pumps. In other embodiments, the plurality of water storage tanks may be in fluid communication with a single pressurizing pump. In some embodiments, each tank of the plurality of water storage tanks may be discharged individually for a flushing operation. In other embodiments, each water storage tank in the plurality of water storage tanks may be discharged in collectively for a flushing operation.

In some embodiments, the pump controller may comprise a user interface for selecting a pressure setting, and a central processing unit in electronic communication with the pressurizing pump. In some embodiments, the pump controller may be capable of controlling the water pressure output of the pressurizing pump. In some embodiments, the pump controller may have an interface and allow a user to select a pressure output (e.g., in a range of 80 to 100 P.S.I.).

In some embodiments, the at least one pressure relief valve may be a water pressure relief valve capable of releasing water from the flushing system upon the water flow reaching a pressure threshold (e.g., 110 P.S.I.). The pressure relief valve may be adjustable such that the pressure threshold may be selected from a range of pressures (e.g., from 50 P.S.I. to 175 P.S.I.). The pressure relief valve may be made of a metal (e.g., brass, copper, or steel), a rubber, or a plastic (e.g., PVC). In some embodiments, the at least one pressure relief valve may comprise a plurality of pressure relief valves, each at a different location on at least one of the water pipe, the flush pipe, and the mixing pipe. In some embodiments, each relief valve in the plurality of relief valves may be set at a different pressure threshold.

In some embodiments, the master valve may be operable to control the release of water from the pressurized water storage tank, and may be a butterfly valve, a diaphragm valve, a globe valve, a gate valve, or the like. In some embodiments, the master valve may be made of a metal (e.g., brass, copper, or steel), a rubber, or a plastic (e.g., PVC). In some embodiments, the master valve may comprise a solenoid for opening or closing the valve, the solenoid being in electronic communication with the system controller. In other embodiments, the master valve may comprise a handle and be operable to be manually placed in an opened position (allowing water to flow through) or a closed position (preventing water from flowing through).

In some embodiments, the flush valve may be a switch valve capable of directing the water flow coming from the water pipe to either the flush pipe or the mixing pipe. In other embodiments, the flush valve may be a butterfly valve, a diaphragm valve, a globe valve, a gate valve, or the like, and only control the flow of water into the flush pipe. In some embodiments, the flush valve may be made of a metal (e.g., brass, copper, or steel), a rubber, or a plastic (e.g., PVC). In some embodiments, the flush valve may comprise a solenoid for changing the position of the switch valve, the solenoid being in electronic communication with the system controller. In other embodiments, the flush valve may comprise a handle and be operable to be manually opened, closed, or adjusted.

In some embodiments, the flush pipe may be made of a metal (e.g., steel, copper, or the like), a rubber, or a plastic (e.g., PVC), and provide fluid communication between the flush valve and either the at least one directing valve or in embodiments not including the directing valve, to the at least one footbath. In some embodiments, the flush pipe may comprise a T junction capable of delivering the water flow to each of a plurality of footbaths. In some embodiments, the flush pipe may comprise an inlet from the mixing pipe, such that water flow from the mixing pipe may enter the flush pipe and be directed to the footbath(s).

Without limiting the invention, embodiments of the mixing pipe may be made of a metal (e.g., steel, copper, or the like), a rubber, or a plastic (e.g., PVC). In some embodiments, the mixing pipe may be positioned to provide fluid communication between the mater valve and the plurality of footbaths. In other embodiments, the mixing pipe may be positioned to provide fluid communication between the flush valve and the at least one directing valve. In some embodiments, the mixing pipe may comprise a Venturi tube with a reduction in inner diameter in order to provide a pressure differential going from a high pressure to a low pressure, the low pressure being utilized to draw the at least one disinfecting or cleaning compound from the at least one chemical tank while the at least one chemical valve is open. In some embodiments, the Venturi tube may include a branching section in fluid communication with the area of low pressure within the Venturi tube, the branching section being in fluid communication with the at least one chemical valve, and being operable to mix the at least one disinfecting or cleaning compound into the flow of water through the Venturi tube, creating fresh disinfecting solution for the footbaths. In other embodiments, the mixing pipe may comprise a PVC pipe with at least one chemical pump for pumping said at least one disinfecting or cleaning compound from said chemical tank.

In some embodiments, a check valve may be positioned between the mixing pipe and each of the chemical valves of the at least one chemical valve, to prevent backflow of water into the at least one chemical valve and the at least one chemical tank. In some embodiments, the at least one chemical tank may comprise a commercially available chemical tank.

In some embodiments, the at least one chemical valve may be operable to control the flow and amount of a disinfecting or cleaning solution into the footbaths, and may be a butterfly valve, a diaphragm valve, a globe valve, a gate valve, or the like. The at least one chemical valve may be made of a metal (e.g., brass, copper, or steel), a rubber, or a plastic (e.g., PVC). In some embodiments, the at least one chemical valve may comprise a solenoid for opening or closing the valve, the solenoid being in electronic communication with the system controller. In other embodiments, the at least one chemical valve may comprise a handle and be operable to be manually opened or closed.

In some embodiments, the air valve may be operable to control the flow of pressurized air from a pressurized air source into the flushing system in order to blow out any moisture remaining in the pipes after a flushing operation. With each of the master valve and the at least one chemical valve closed, the air valve may be opened to blow air through the pipes to the footbath, thereby removing all moisture from the pipes between the air valve and the footbath. In some embodiments, the air valve may be made of a metal (e.g., brass, copper, or steel), a rubber, or a plastic (e.g., PVC). In some embodiments, the air valve may comprise a solenoid for opening, closing, or adjusting the valve, the solenoid being in electronic communication with the system controller. In other embodiments, the at air valve may comprise a handle and be operable to be manually opened or closed. In some embodiments, the pressurized air source may be an air compressor with an electric motor and a tank capable of storing air under high pressure (e.g., up to 175 P.S.I.). In some embodiments, the air compressor may include a pressure regulator capable of regulating the air pressure at an air outlet, (e.g., from 10 to 50 P.S.I., and preferably at approximately 30 P.S.I.).

In some embodiments, the at least one directing valve may be a switch valve capable of directing the water flow to a single footbath, or to one or more of the plurality of footbaths. In embodiments of the flushing system including a first footbath and a second footbath, and a directing valve may be provided for each footbath for directing the flow to that footbath, or a single directing valve may be operable to direct the flow of water into the first footbath, or the second footbath, or both the first footbath and the second footbath concurrently. In some embodiments, the at least one directing valve may be made of a metal (e.g., brass, copper, or steel), a rubber, or a plastic (e.g., PVC). In some embodiments, the at least one directing valve may comprise a solenoid for changing the position of the switch valve, the solenoid being in electronic communication with the system controller. In other embodiments, the at least one directing valve may comprise a handle and be operable to be adjusted manually.

In some embodiments, the at least one footbath may comprise an elongated, shallow, open top water enclosure with a water inlet and a water outlet. The water in the at least one footbath may have a depth sufficient to immerse the hoof or foot of an animal as the animal walks through the footbath. The at least one footbath may comprise a single footbath, or a plurality of footbaths.

In one implementation, the present invention relates to flushing system for a footbath, comprising: a pressurizing pump for pumping water from a water source and pressurizing said water; a storage tank for holding said water under pressure until a flushing operation is initiated; a check valve for preventing backflow of water toward said pressurizing pump; at least one pressure gauge; a pump controller; at least one pressure relief valve; a master valve for controlling the release of said water from said storage tank; a flush valve for controlling the flow of said water toward either a flush pipe or a mixing pipe, said mixing pipe being operable to mix at least one disinfecting or cleaning compound into said water; at least one chemical valve for controlling the flow and amount of said disinfecting or cleaning solution being added to said water; and at least one footbath. In some implementations, the flushing system may further comprise an air valve in communication with a pressurized air source, said pressurized air source comprising a pressure regulator. In some implementations, said mixing pipe comprises a Venturi tube. In some implementations, the flushing system may further comprise at least one flow sensor. In some implementations, said pump controller comprises a system controller. In some implementations, the flushing system may further comprise at least one chemical check valve for preventing backflow of water toward said at least one chemical valve. In some implementations, the flushing system may further comprise an air check valve for preventing backflow of water toward said air valve.

In one implementation, the present invention relates to a method for using the above described flushing system, comprising the steps of: setting a pressure setting for said pressurizing pump via said pump controller; turning on said pressurizing pump until said storage tank is full; and upon said at least one footbath becoming fouled, opening said master valve. In some implementations, the method may further comprise the steps of: adjusting said flush valve to direct said water to said mixing pipe; and opening said at least one chemical valve. In some implementations, the method may further comprise the steps of: closing said master valve; closing said at least one chemical valve; and opening said air valve.

In one implementation, the present invention relates to flushing system for a footbath, comprising: at least one pressurizing pump for pumping water from a water source and pressurizing said water; a plurality of storage tanks for holding said water under pressure until a flushing operation is initiated; a check valve for preventing backflow of water toward said pressurizing pump; at least one pressure gauge; at least one optional flow sensor; a master valve for controlling the release of said water from said plurality of storage tanks; a flush valve for directing the flow of said water toward either a flush pipe or a mixing pipe, said mixing pipe being operable to mix at least one disinfecting or cleaning compound into said water; at least one chemical valve for controlling the flow and amount of said disinfecting or cleaning solution being added to said water; an air valve in communication with a pressurized air source, said pressurized air source comprising a pressure regulator; a system controller; a plurality of footbaths comprising a first footbath and a second footbath; and at least one directing valve operable to direct the flow of said water into each footbath, or to direct the flow of water to said first footbath only, or second footbath only, or both said first footbath and said second footbath concurrently. In some implementations, the system controller comprises a user interface and a central processing unit, and be in electronic communication with said at least one pressurizing pump, said at least one pressure gauge, said at least one optional flow sensor, said master valve, said flush valve, said at least one chemical valve, said at least one directing valve, and said air valve. In some implementations, the system controller is operable to: receive a pressure signal from said at least one pressure gauge; receive a flow signal from said at least one optional flow sensor; and receive a position signal from each of said master valve, said flush valve, said at least one chemical valve, said at least one directing valve, and said air valve.

In some implementations, the user interface is operable to display said pressure signals, said flow signals (if available), and said position signals, and allow a user to control said pressurizing pump, said master valve, said flush valve, said at least one chemical valve, said at least one directing valve, and said air valve. In some implementations, the system controller further comprises a timer and is operable to be programmed to turn said at least one pressurizing pump on or off, open or close said master valve, adjust the position of said flush valve, open or close said at least one chemical valve, open or close said air valve, and adjust the position of said at least one directing valve, each at a specific time. In some implementations, the system controller is in electronic communication with a remote computing device, such that a user may interface with said system controller remotely via said remote computing device. In some implementations, said electronic communication comprises wireless electronic communication. In some implementations, said mixing pipe comprises a Venturi tube. In some implementations, the flushing system further comprises at least one chemical check valve for preventing backflow of water toward said at least one chemical valve. In some implementations, the flushing system further comprises an air check valve for preventing backflow of water toward said air valve.

In one implementation, the present invention relates to a method for using the above described flushing system, comprising the steps of utilizing said user interface to: set a pressure setting for said pressurizing pump; turn on said pressurizing pump until said storage tank is full; and upon said at least one footbath becoming fouled, open said master valve. In some implementations, the method further comprises the steps of utilizing said user interface to: adjust said flush valve to direct said water to said mixing pipe; and open said at least one chemical valve. In some implementations, the method further comprises the steps of utilizing said user interface to: close said master valve; close said at least one chemical valve; and open said air valve.

In some implementations, the method comprises the steps of utilizing said remote computing device to: set a pressure setting for said pressurizing pump; turn on said pressurizing pump until said storage tank is full; and upon said at least one footbath becoming fouled, open said master valve. In some implementations, the method further comprises the steps of utilizing said remote computing device to adjust said flush valve to direct said water to said mixing pipe; and open said at least one chemical valve. In some implementations, the method further comprises the steps of utilizing said remote computing device to: close said master valve; close said at least one chemical valve; and open said air valve.

In alternative embodiments, the pressurized storage tanks may be provided in parallel, and may be controlled independently of each other. In such embodiments, a manifold is provided downstream from the parallel storage tanks, with each tank having an independently operated discharge valve on a pipe of the manifold. By way of example, and without limitation, if three storage tanks are provided in parallel, one valve operating the first tank may be opened to allow the first tank to discharge, while the other two tanks remain pressurized; the second tank may be independently discharged by operating a second valve; and the third tank may be independently discharged by operating a third valve. Check valves and relief valves may also be provided for each of the parallel tanks. It is to be appreciated that where parallel storage tanks are provided, multiple tanks may be provided in series in each parallel. By way of example, and without limitation, instead of three tanks provided in parallel, three pairs of tanks may be provided in parallel, with the two tanks of each pair provided in series. In such an example, one valve operating the first pair of tanks may be opened to allow the first pair of tanks to discharge, while the other two pairs tanks remain pressurized; the second pair of tanks may be independently discharged by operating a second valve; and the third pair of tanks may be independently discharged by operating a third valve.

It is an objective of the present invention to provide an improved flushing system for an animal footbath for use at locations where the available water supply alone does not provide sufficient pressure for normal flushing operations.

It is a further objective of the present invention to provide a pressurized flushing system for a bovine footbath at a dairy or ranch without a municipal water source.

It is a further objective of the present invention to provide a flushing system for a bovine footbath which is operable to flush out fouled water from the footbath and replace it with fresh disinfecting solution as part of the same flushing operation.

It is a further objective of the present invention to provide a flushing system which may be controlled to flush out only a particular fouled footbath among a plurality of footbaths, or all footbaths at once.

It is a further objective of the present invention to provide a flush controller which may be programmed or remotely operated to monitor the flow rates and/or water pressures at various points in the flushing system, and to alter the positions of valves or the pressure setting of the pressurizing pump accordingly.

It is a further objective of the present invention to provide a flushing system which may remove any remaining moisture from the pipes of the system via a pressurized air source in order to prevent bacterial growth, and pipe-bursting in freezing temperatures.

Additional aspects and objects of the invention will be apparent from the detailed descriptions and the claims herein.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. It is to be appreciated that the invention is intended to cover alternatives, modifications, and equivalents that are included within the scope of the invention as defined by the claims. In the following disclosure, specific details are given as a way to provide a thorough understanding of the invention. However, it will be apparent to one skilled in the art that the present invention may be practiced without these specific details.

Figure 1:
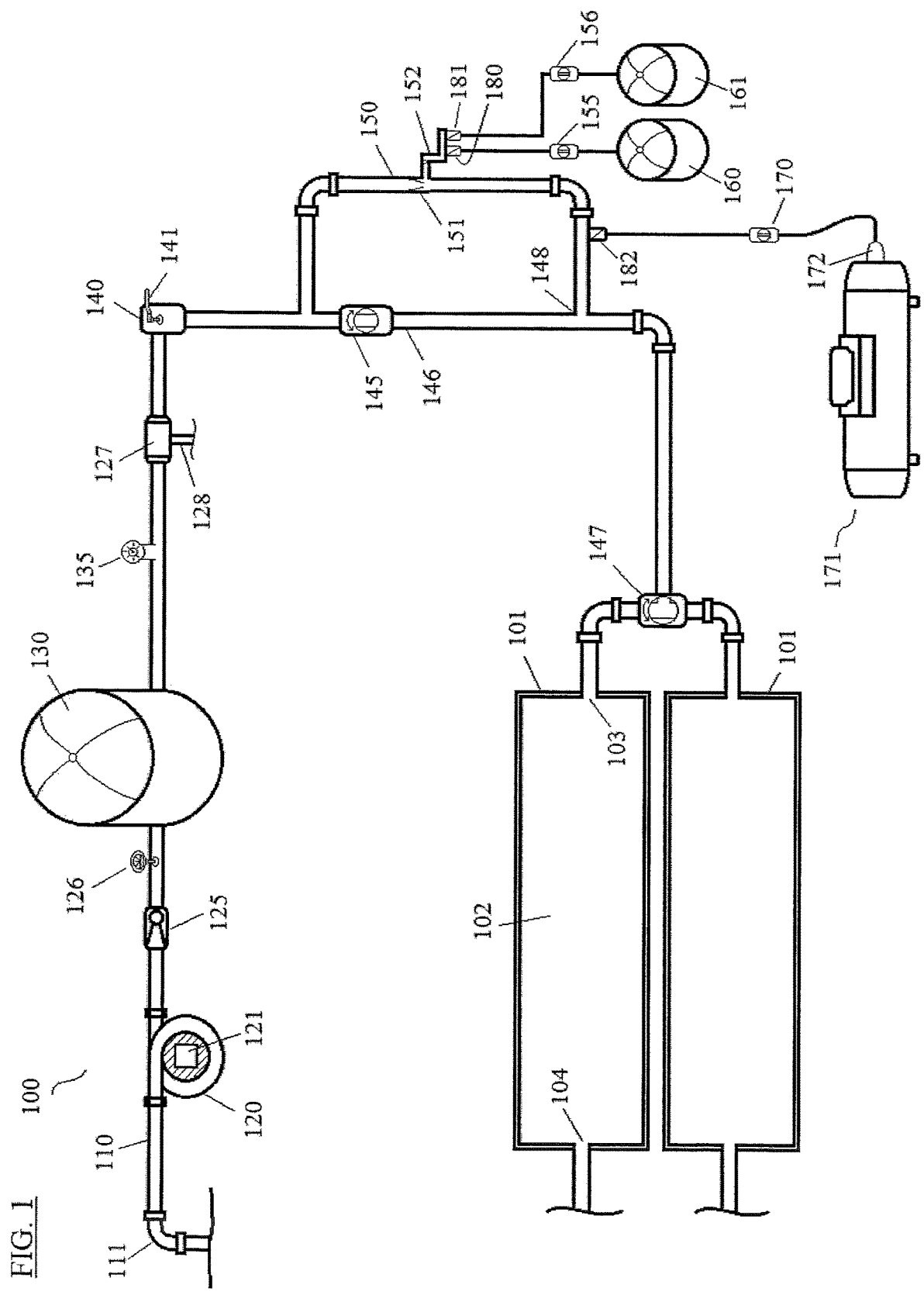
FIG. 1 shows a top-down perspective view of an animal footbath flushing system, according to an embodiment of the present invention.
Figure 2:
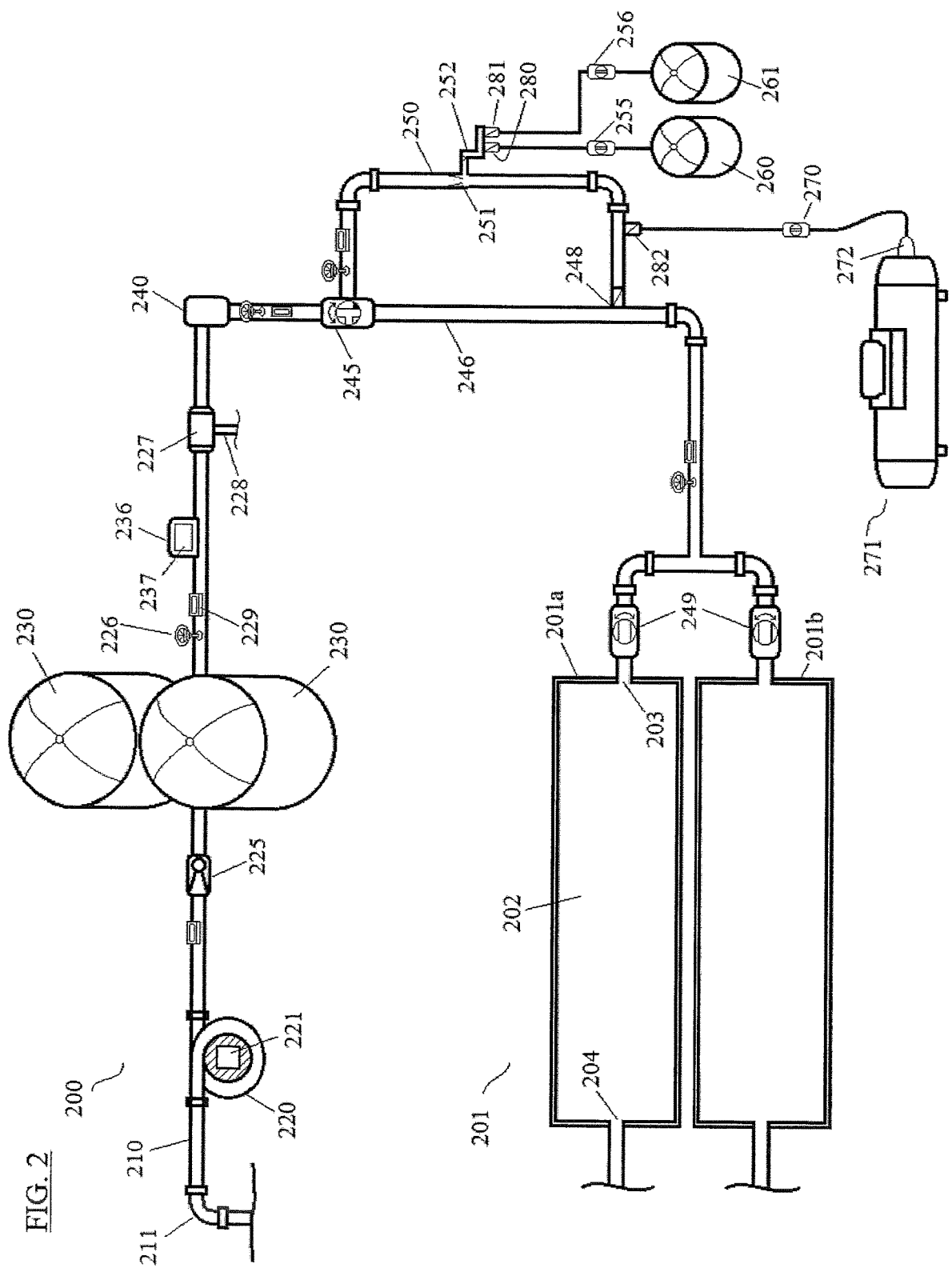
FIG. 2 shows a top-down perspective view of an animal footbath flushing system, according to an embodiment of the present invention.

Referring to the drawings, wherein like reference characters designate like or corresponding parts throughout the several views, and referring particularly to FIGS. 1-2, it is seen that the present invention includes various embodiments of a flushing system for an animal footbath which is operable to put water from a low-pressure water source under sufficient pressure to flush out the footbath and replace the water with fresh disinfecting solution, and store the pressurized water until a flushing operation is needed.

Without limiting the invention, FIG. 1 illustrates an exemplary flushing system 100 for flushing out at one or more footbaths 101. It is to be appreciated that one or more of the features of the embodiment illustrated in FIG. 1 and described herein may be incorporated into the embodiment of FIG. 2 below, and vice versa, providing many variations in available embodiments of the present invention. The illustrated flushing system 100 of FIG. 1 may comprise: an inlet water pipe 110 connected to a water source 111; a pressurizing pump 120 for pumping water from the water source 111 to a storage tank 130 and placing the water under pressure in the tank; a check valve 125 for preventing backflow of the pressurized water; one or more water pressure gauges 126 for measuring water pressure in the water pipe 110; at least one water storage tank 130 for storing pressurized water; an optional pump controller 135 for controlling the pressure setting of the pressurizing pump 120; a pressure relief valve 127 for relieving pressure in the flushing system 100 when the water pressure in the water pipe 110 reaches an upper threshold; a master valve 140 for releasing water from the storage tank 130 during a flushing operation; a flush valve 145 for allowing or preventing the flow of water into a flush pipe 146 for directing the water flow directly toward one or more footbaths 101; a mixing pipe 150 positioned to be in communication with the master valve 140 and as an alternative route with respect to the flush pipe 146, the mixing pipe 150 comprising a Venturi tube and being in fluid communication with at least one chemical valve 155, 156 for adding at least one disinfecting or cleaning compound to the water flow; at least one chemical tank 160, 161 for storing disinfecting or cleaning compounds, each chemical tank 160, 161 being in communication with a chemical valve 155, 156; one or more directing valves 147 for directing water into each footbath; an air valve 170 in communication with a compressed air source 171, the compressed air source 171 having a pressure regulator 172 for controlling the air pressure at the air valve 170; an air check valve 182; and at least one chemical check valve 180, 181 for each chemical tank.

In the embodiment of FIG. 1, the pressurizing pump 120 may comprise a water pump with a motor 121. In some embodiments, the motor may be a 120 volt A/C electric motor, the electric motor being in electronic communication with a 120 volt A/C power source. In other embodiments, the motor may be an internal combustion motor. In some embodiments, the water pump may be a 3-stage centrifugal pump capable of creating up to 100 P.S.I. of water pressure in the water pipe. In other embodiments, the water pump may be a turbine pump. In some embodiments, the pressurizing pump may be in electronic communication with and be controlled by the pump controller 135, and may also comprise a manual control for turning the pump on and off, and for setting the pressure.

In the embodiment of FIG. 1, the check valve 125 may be a one-way brass valve with a ball-cone-spring configuration capable of allowing water to flow from the pressurizing pump 120 to the water storage tank 130, but not in the reverse direction. In other embodiments, the check valve may comprise a one-way valve comprising at least one of brass, steel, or PVC. The air check valve 182 preventing backflow of water into the air valve 170, and the chemical check valves 180, 181 preventing backflow of water into the plurality of chemical valves 155, 156 may also be one-way brass valves with a ball-cone-spring configuration.

In the embodiment of FIG. 1, the pressure gauge(s) 126 may be a P.S.I. gauge capable of reading and displaying water pressure within in a range (e.g., from 0 P.S.I. to 150 P.S.I.).

In the embodiment of FIG. 1, the water storage tank 130 may comprise a pressurized water storage accumulator with a capacity ranging from 50 to 250 gallons, and preferably ranging from 91 to 119 gallons. In some embodiments, the water storage tank 130 may be capable of storing water at a maximum pressure of up to 125 P.S.I. In other embodiments, the water storage tank 130 may have a maximum pressure of up to 150 P.S.I. The water storage tank 130 may be in fluid communication with both the pressurizing pump 120 and the master valve 140 via the water pipe 110.

In the embodiment of FIG. 1, the at least one pressure relief valve 127 may be a water pressure relief valve capable of releasing water from the flushing system 100 into a relief pipe 128 upon the water flow reaching a pressure threshold (e.g., 110 P.S.I.), the relief pipe 128 leading to a wastewater drain. In some embodiments, the at least one pressure relief valve 127 may comprise a plurality of pressure relief valves, each at a different location on at least one of the water pipe 110, the flush pipe 146, and the Venturi tube 150. In some embodiments, each relief valve in the plurality of relief valves may be set at a different pressure threshold.

In the embodiment of FIG. 1, the master valve 140 may be operable to control the release of water from the pressurized water storage tank 130, and may be a butterfly valve, a diaphragm valve, a globe valve, a gate valve, or the like. The master valve 140 may comprise a handle 141 and be operable to be manually opened or closed.

In the embodiment of FIG. 1, the flush valve 145 may be a butterfly valve, a diaphragm valve, a globe valve, a gate valve, or the like, and be operable to control the flow of water into the flush pipe 146. In some embodiments, the flush valve 145 may comprise a handle and be operable to be manually opened, closed, or adjusted.

In the embodiment of FIG. 1, the flush pipe 146 may provide fluid communication between the flush valve 145 and the plurality of footbaths 101. The flush pipe may comprise a T junction 147 capable of delivering the water flow to each of a plurality of footbaths 101, and an inlet 148 from the Venturi tube 150, such that water flow from the Venturi tube 150 may enter the flush pipe 146 and be directed to the plurality of footbaths 101.

Without limiting the invention, in the embodiment of FIG. 1, the Venturi tube 150 may be positioned to provide fluid communication between the master valve 140 and the plurality of footbaths 101. The Venturi tube 150 may include a reduction in inner diameter at 151 in order to provide a pressure differential going from a high pressure to a low pressure, the low pressure being utilized to draw the plurality of disinfecting or cleaning compounds from the plurality of chemical tanks 160, 161 while any one of the plurality of chemical valves 155, 156 is open. The Venturi tube 150 may include a branching section 152 in fluid communication with the area of low pressure at 151, the branching section 152 providing fluid communication between the area of low pressure at 151 and the at least one chemical valves 155, 156 and being operable to mix the disinfecting or cleaning compounds into the flow of water through the Venturi tube 150, creating fresh disinfecting solution for the plurality of footbaths 101. Chemical check valves 180, 181 may be positioned between the Venturi tube 150 and each valve of the plurality of chemical valves 155, 156 to prevent backflow of water into each of the chemical valves 155, 156.

In the embodiment of FIG. 1, the at least one chemical valve 155, 156 may be operable to control the flow and amount of disinfecting or cleaning solutions into the flow of water, and may comprise at least one of a butterfly valve, a diaphragm valve, a globe valve, a gate valve, or the like. In some embodiments, the at least one chemical valve 155, 156 may comprise a handle and be operable to be manually opened or closed.

In the embodiment of FIG. 1, the air valve 170 may be operable to control the flow of pressurized air from the pressurized air source 171 into the flushing system 100 while the master valve 140 and the chemical valves 155, 156 are each in closed positions in order to blow out any moisture remaining in the pipes after a flushing operation. In some embodiments, the air valve 170 may comprise a handle and be operable to be manually opened or closed. The pressurized air source 171 may comprise an air compressor with a motor electric motor and a tank capable of storing air under high pressure (e.g., up to 175 P.S.I.). The air compressor 171 may include a pressure regulator 172 capable of regulating the air pressure at an air outlet, (e.g., from 10 to 50 P.S.I., and preferably at approximately 30 P.S.I.).

Each footbath of the plurality of footbaths 101 may comprise an elongated, shallow, open top water enclosure 102 with a water inlet 103 and a water outlet 104, the water inlet 103 being in fluid communication with the T junction 147, and the water outlet 104 being in communication with a wastewater drain. The water level in open top water enclosure 102 of each footbath of the plurality of footbaths 101 may have a depth sufficient to immerse the hoof or foot of an animal as the animal walks through the footbath.

Without limiting the invention, FIG. 2 illustrates an exemplary flushing system 200 for flushing out a plurality of footbaths 201. It is to be appreciated that one or more of the features of the embodiment illustrated in FIG. 2 and described herein may be incorporated into the embodiment of FIG. 1, and vice versa, providing many variations in available embodiments of the present invention. In the embodiment illustrated in FIG. 2, the flushing system 200 may comprise: a water pipe 210 connected to a water source 211, a pressurizing pump 220 for pumping water from the water source 211 and pressurizing the water; a check valve 225 for preventing backflow of the pressurized water; one or more water pressure gauges 226 for measuring water pressure at various points in the flushing system 200; a plurality of water storage tanks 230 for storing pressurized water; at least one pressure relief valve 227 with a pressure relief pipe 228 leading to a wastewater drain for relieving pressure in the flushing system 200; a master valve 240 for releasing water from the plurality of storage tanks 230 during a flushing operation; a flush valve 245 for directing the water flow to either a flush pipe 246 or a mixing pipe 250, the flush pipe 246 directing the water flow directly to the plurality of footbaths 201, and the mixing pipe 250 comprising a Venturi tube having one or more valves 255, 256 for adding one or more disinfecting or cleaning compounds to the water flow; one or more chemical tanks 260, 261 for storing one or more disinfecting or cleaning compounds, the chemical tanks 260, 261 being in fluid communication with the chemical valves 255, 256; an air valve 270 in communication with a compressed air source 271, the compressed air source 271 having a pressure regulator 272 for controlling the air pressure at the air valve 270; one or more directing valves 249 for directing water into each of the one or more footbaths of the plurality of footbaths 201; at least one optional flow sensor 229 for monitoring the water flow in at least one of the water pipe 210, the flush pipe 246, and the Venturi tube 250; an air check valve 282 for preventing backflow of water into the air valve 270 and plurality of chemical check valves 280, 281 for preventing backflow of water into the chemical valves 255, 256; and a system controller 236 for receiving signals from the pressure gauge(s) 226 and the at least one optional flow sensor 229, and controlling the pressurizing pump 220 and each of the master valve 240, the flush valve 245, the chemical valves 255, 256, the air valve 270, and the one or more directing valves 249.

Without limiting the invention, in some embodiments the system controller 236 may comprise a user interface 237 and a central processing unit in electronic communication with each of the pressurizing pump 220, the at least one pressure gauge 226, the at least one optional flow sensor 229 (if used), the master valve 240, the flush valve 245, the chemical valves 255, 256, the at least one directing valve 249, and the air valve 270. The system controller may be capable of: receiving a pressure signal from each of the pressure gauges 226; receiving a flow signal from the at least one optional flow sensor 229 (if used); receiving position signals from each of the master valve 240, the flush valve 245, the chemical valves 255, 256, the at least one directing valve 249, and the air valve 270; determining whether any such pressure signal, flow signal, or position signal is outside of the parameters set via the user interface 237; and if so, taking a corrective action based on the signal. The corrective action may comprise at least one of: sending a command to the pressurizing pump 220 to turn on, shut off, or alter the pressure setting; sending a command to the master valve 240 to open or to close; sending a command to the flush valve 245 to alter position; sending a command to a chemical valve of the plurality of chemical valves 255, 256 to open or to close; sending a command to the at least one directing valve 249 to open, close or alter position; sending a command to the air valve 270 to open or to close; and displaying a warning signal at the user interface 237.

In some embodiments, the user interface 237 may be utilized by a user to select a pressure setting at the pressurizing pump 220, control the number and amount of disinfecting and cleaning compounds to be added to the water flow via the chemical valves 255, 256, initiate a flushing operation via the master valve 240, control the position and timing of adjustments to the flush valve 245, control the position and timing of adjustments to the at least one directing valve 249, and blow out moisture from the flushing system via the air valve 270. In some embodiments, the system controller 236 may include a timer and be operable to be set to initiate a flushing operation at a specified time of day or on a regular interval. In some embodiments, the system controller 236 may be in electronic communication with a remote computing device (e.g., a personal computer or a cellular device), such that a user may interface with the system controller 236 remotely.

In some embodiments, the pressurizing pump 220 may comprise a water pump with a motor 221. The pressurizing pump 220 may be in electronic communication with, and be controlled by, the system controller 236, and may also comprise a manual control for turning the pump on and off, and for setting the pressure.

In some embodiments, the at least one pressure gauge 226 may comprise at least one P.S.I. gauge capable of reading and displaying water pressure within in a range (e.g., from 0 P.S.I. to 150 P.S.I.). The one or more pressure gauges may be positioned at various areas in the flushing system 200, including at the water pipe 210 both upstream and downstream of the check valve 225 and the water tanks 230, downstream of the master valve 240, at the plush pipe 246, and at the Venturi tube 250. The one or more pressure gauges 226 may be in electronic communication with, and be capable of sending a water pressure signal to, the system controller 236.

In some embodiments, the check valve 225 may be a one-way brass valve with a ball-cone-spring configuration capable of allowing water to flow from the pressurizing pump 220 to the water storage tank 230, but not in the reverse direction. In some embodiments, the air check valve 282 preventing backflow of water into the air valve 270, and the chemical check valves 280, 281 preventing backflow of water into the plurality of chemical valves 255, 256 may also be one-way brass valves with a ball-cone-spring configuration.

In some embodiments, the plurality of water storage tanks 230 may comprise at least one pressurized water storage accumulator with a capacity ranging from 50 to 250 gallons, and preferably ranging from 91 to 119 gallons. In some embodiments, the plurality of water storage tanks 230 may be in fluid communication with each other, with the pressurizing pump 220 and with the master valve 240 via the water pipe 210. In some embodiments, the plurality of water storage tanks 230 may be discharged collectively for a flushing operation.

In some embodiments, the at least one pressure relief valve 227 may be a water pressure relief valve capable of releasing water from the flushing system 200 into a relief pipe 228 upon the water flow reaching a pressure threshold (e.g., 110 P.S.I.), the relief pipe 228 leading to a wastewater drain.

In some embodiments, the master valve 240 may be operable to control the release of water from the pressurized plurality of water storage tanks 230, and may comprise a butterfly valve, a diaphragm valve, a globe valve, a gate valve, or the like. In some embodiments, the master valve 240 may comprise a solenoid for opening or closing the valve, the solenoid being in electronic communication with the system controller 236.

In some embodiments, the flush valve 245 may comprise a switch valve capable of directing the water flow coming from the water pipe 210 via the master valve 240 to either the flush pipe 246 or the Venturi tube 250. In some embodiments, the flush valve 245 may comprise a solenoid for changing the position of the valve, the solenoid being in electronic communication with the system controller 236.

In some embodiments, the flush pipe 246 may provide fluid communication between the flush valve 245 and the at least one directing valve 249. In some embodiments, the flush pipe may comprise a one-way inlet 248 from the Venturi tube 250, such that water flow from the Venturi tube 250 may enter the flush pipe 246 and be directed to the plurality of footbaths 201, but water flow is blocked from entering the Venturi tube 250 at the one-way inlet 248.

Without limiting the invention, in some embodiments, the Venturi tube 250 may be positioned to provide fluid communication between the flush valve 245 and the plurality of footbaths 101. The Venturi tube 250 may include a reduction in inner diameter at 251 in order to provide a pressure differential going from a high pressure to a low pressure, the low pressure being utilized to draw one or more of the disinfecting or cleaning compounds from the one or more chemical tanks 260, 261 while any one of the chemical valves 255, 256 is open. The Venturi tube 250 may include a branching section 252 in fluid communication with the area of low pressure at 251, the branching section 252 providing fluid communication between the area of low pressure at 251 and the chemical valves 255, 256 and being operable to mix the plurality of disinfecting or cleaning compounds into the flow of water through the Venturi tube 250, creating fresh disinfecting solution for the plurality of footbaths 201. Chemical check valves 280, 281 may be positioned between the Venturi tube 250 and each chemical valve 255, 256 to prevent backflow of water into the plurality of chemical valves 255, 256.

In some embodiments, the one or more chemical valves 255, 256 may be operable to control the flow and amount of each compound of the one or more disinfecting or cleaning compounds into the flow of water, and may comprise at least one of a butterfly valve, a diaphragm valve, a globe valve, a gate valve, or the like. In some embodiments, the chemical valves 255, 256 may each comprise a solenoid for opening or closing the valve, the solenoid being in electronic communication with the system controller 236.

In some embodiments, the air valve 270 may be operable to control the flow of pressurized air flowing from the pressurized air source 271 into the flushing system 200, while the master valve 240 and the plurality of chemical valves 255, 256 are each in closed positions, in order to blow out any moisture remaining in the pipes after a flushing operation. Blowing moisture out of the pipes helps prevent the pipes from bursting in freezing weather. The air valve 271 may comprise a solenoid for opening, closing, or adjusting the valve, the solenoid being in electronic communication with the system controller 236.

In some embodiments, the pressurized air source 271 may comprise an air compressor with a motor and a tank capable of storing air under high pressure (e.g., up to 175 P.S.I.). The air compressor 271 may include a pressure regulator 272 capable of regulating the air pressure at an air outlet, (e.g., from 10 to 50 P.S.I., and preferably at approximately 30 P.S.I.).

In some embodiments, the plurality of footbaths 201 may comprise a first footbath 201*a* and a second footbath 201*b*. Each of the first footbath 201*a* and the second footbath 201*b* may comprise an elongated, shallow, open top water enclosure 202 with a water inlet 203 and a water outlet 204, the water inlet 203 being in fluid communication with a directing valve 249 for each footbath, and the water outlet 204 being in communication with a wastewater drain. The water level in the open top water enclosure 202 of each of the first footbath 201*a* and the second footbath 201*b* may have a depth sufficient to immerse the hoof or foot of an animal as the animal walks through the footbath.

In preferred embodiments, one directing valve 249 is provided for each footbath to control the flow of fluid into that particular footbath. In some embodiments, a single directing valve 249 may be a switch valve capable of directing the water flow from the flush pipe 246 to the two footbaths 201. Such a directing valve 249 may be operable to direct the flow of water into the first footbath 201*a* only, or the second footbath 201*b* only, or both the first footbath 201*a* and the second footbath 201*b* concurrently. The directing valve 249 may comprise a solenoid for changing the position of the valve, the solenoid being in electronic communication with the system controller 236.

In alternative embodiments, multiple pressurized storage tanks 230 may be provided in parallel, and may be controlled independently of each other. In such embodiments, a manifold (not shown) is provided downstream from the parallel storage tanks 230, and each tank will have an independently operated discharge valve 240 on a pipe of the manifold. In some embodiments, where parallel storage tanks are provided, multiple tanks may be provided in series in each parallel. By way of example, and without limitation, three pairs of tanks may be provided in parallel, with the two tanks of each pair provided in series. In such an example, one valve 240*a* operating the first pair of tanks 230*a*, 230*a*' may be opened to allow the first pair of tanks to discharge, while the other two pairs tanks remain pressurized; the second pair of tanks 230*b*, 230*b*' may be independently discharged by operating a second valve 240*b*; and the third pair of tanks 230*c*, 230*c*' may be independently discharged by operating a third valve 240*c*.

The present invention provides systems and methods for flushing out one or more bovine footbaths at a facility without a pressurized water source. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:
1. A flushing system for a footbath comprising:
 a. at least one storage tank for holding water under pressure;
 b. an input line leading into said at least one storage tank having a pump thereon for bringing water from a water source to said at least one storage tank and pressurizing said water in said at least one storage tank;
 c. a check valve on said input line for preventing backflow of water to said pump;
 d. an output line leading from said at least one storage tank having a pressure gauge and a master valve thereon for controlling the release of said water from said at least one tank;
 e. a flush valve on said output line for directing the flow of said water to either a flush pipe leading to at least one footbath or to a mixing pipe branching off of the output line wherein said mixing pipe comprises a Venturi tube;
 f. at least one source of disinfecting or cleaning compound in communication with said Venturi tube;
 g. at least one chemical valve for controlling the amount of said disinfecting or cleaning compound added to said water in said Venturi tube;

h. at least one chemical check valve for preventing backflow of water toward said at least one chemical valve;
i. a connecting pipe downstream from said Venturi tube connecting said Venturi tube and said flush pipe;
j. a pressurized air source feeding into said connecting pipe for removing moisture after a flushing operation when said master valve is in a closed position, wherein said pressurized air source has a connection positioned between the Venturi tube and the flush pipe; and
k. at least one footbath downstream from said flush pipe.

2. The system of claim 1, further comprising at least one directing valve on said flush pipe for each of said at least one footbath.

3. The flushing system of claim 2 further comprising a controller in electronic communication with said pump, said pressure gauge, said master valve, said flush valve, said at least one chemical valve and said at least one directing valve for controlling the flow of fluids through said system.

4. The flushing system of claim 2 further comprising an air valve for controlling the flow of air from said air source, and an air check valve for preventing backflow of fluid to said air source.

5. The flushing system of claim 4 further comprising a controller in electronic communication with said pump, said master valve, said flush valve, said at least one chemical valve, said at least one directing valve, said air valve, and said at least one pressure gauge for controlling the flow of fluids through said system.

6. The flushing system of claim 5, wherein said controller is in electronic communication with a remote computing device, such that a user may interface with said system controller remotely via said remote computing device.

7. The flushing system of claim 6, wherein said electronic communication comprises wireless electronic communication.

8. The flushing system of claim 6, wherein said controller is in wireless electronic communication with said remote computing device.

9. The system of claim 5 wherein said controller comprises a user interface and a central processing unit.

10. The flushing system of claim 4 further comprising at least one flow sensor.

11. A flushing system for a footbath comprising:
a. at least one storage tank for holding water under pressure;
b. an input pipe to said at least one storage tank having a pump thereon for bringing water from a water source to said at least one storage tank and pressurizing said water in said at least one storage tank;
c. a check valve on said input pipe for preventing backflow of water to said pump;
d. an output pipe from said at least one storage tank having a master valve thereon for controlling the release of said water from said at least one storage tank;
e. a flush valve on said output pipe for directing the flow of said water to either a flush pipe leading to at least one footbath or to a mixing pipe branching off of the output pipe wherein said mixing pipe comprises a Venturi tube;
f. at least one source of disinfecting or cleaning compound in communication with said Venturi tube;
g. at least one chemical valve for controlling the amount of said disinfecting or cleaning compound added to said water in said Venturi tube;
h. at least one chemical check valve for preventing backflow of water toward said at least one chemical valve;
i. a connecting pipe downstream from said Venturi tube connecting said Venturi tube and said flush pipe;
j. at least one pressure gauge on one of said pipes;
k. a pressurized air source feeding into said connecting pipe for blowing out moisture after a flushing operation when said master valve is in a closed position, wherein said pressurized air source has a connection positioned between the Venturi tube and the flush pipe;
l. an air valve for controlling the flow of air from said air source;
m. an air check valve for preventing backflow of fluid to said air source; and
n. at least one footbath downstream from said flush pipe.

12. The system of claim 11, further comprising at least one directing valve on said flush pipe for each of said at least one footbath.

13. The system of claim 12 further comprising a controller in electronic communication with said pump, said master valve, said flush valve, said at least one chemical valve, said air valve, said at least one directing valve, and said at least one pressure gauge for controlling the flow of fluids through said system.

14. The system of claim 13 wherein system controller further comprises a user interface and a central processing unit, and wherein said user interface is operable to display pressure information from said at least one pressure gauge, and information regarding the positions of said pump, said master valve, said flush valve, said at least one chemical valve, said at least one directing valve, and said air valve.

15. The system of claim 13 wherein system controller further comprises a user interface and a central processing unit, and wherein said user interface allows a user to control said pressurizing pump, said master valve, said flush valve, said at least one chemical valve, said at least one directing valve, and said air valve.

16. The system of claim 13, wherein said controller further comprises at least one timer capable of turning performing an action selected from the following group at a specified time: turning said pump on or off, opening or closing said master valve, adjusting the position of said flush valve, opening or closing said at least one chemical valve, opening or closing said air valve, opening or closing said at least one directing valve, and combinations thereof.

17. The system of claim 15, wherein said system controller is in electronic communication with a remote computing device, such that a user may interface with said system controller remotely via said remote computing device.

18. The system of claim 17, wherein said electronic communication comprises wireless electronic communication.

19. The system of claim 17, wherein said controller is in wireless electronic communication with said remote computing device.

20. The system of claim 11 further comprising at least one pressure relief valve on said output from said storage tank.

21. The system of claim 11 wherein said at least one storage tank comprises a plurality of storage tanks provided in series.

22. The system of claim 11 wherein said at least one storage tank comprises a plurality of storage tanks provided in parallel, each of said storage tanks being in communication with said pump, and each of said storage tanks being in communication with a pipe of a manifold provided downstream from said plurality of storage tanks, and wherein a plurality of master valves are provided on each pipe of said manifold, one such valve for each of said plurality of tanks.

23. A method of flushing an animal footbath system, the animal footbath system comprising:
   a. at least one storage tank for holding water under pressure;
   b. an input line leading into said at least one storage tank having a pump thereon for bringing water from a water source to said at least one storage tank and pressurizing said water in said at least one storage tank;
   c. a check valve on said input line for preventing backflow of water to said pump;
   d. an output line leading from said at least one storage tank having a pressure gauge and a master valve thereon for controlling the release of said water from said at least one storage tank;
   e. a flush valve on said output line for directing the flow of said water to either a flush pipe leading to at least one footbath or to a mixing pipe branching off of the output line wherein said mixing pipe comprises a Venturi tube;
   f. at least one source of disinfecting or cleaning compound in communication with said Venturi tube;
   g. at least one chemical valve for controlling the amount of said disinfecting or cleaning compound added to said water in said Venture tube;
   h. at least one chemical check valve for preventing backflow of water toward said at least one chemical valve;
   i. a connecting pipe downstream from said Venturi tube connecting said Venturi tube and said flush pipe;
   j. a pressurized air source having an air valve feeding into said connecting pipe for removing moisture after a flushing operation when said master valve is in a closed position, wherein said pressurized air source has a connection positioned between the Venturi tube and the flush pipe;
   k. at least one footbath downstream from said flush pipe; and
   l. at least one directing valve on said flush pipe for each of said at least one footbath;
   wherein the method comprises the steps of:
   1. turning on said pump until said at least one storage tank is filled with water under pressure;
   2. adjusting said flush valve to direct flow from said at least one storage tank to said flush pipe;
   3. opening said master valve to cause water under pressure to be released from said at least one storage tank; and
   4. opening said at least one directing valve to allow said water to reach said at least one footbath.

24. The method of claim 23 comprising the additional steps of:
   5. adjusting said flush valve to direct flow from said at least one storage tank to said Venturi tube; and
   6. opening said at least one chemical valve.

25. The method of claim 24 comprising the additional steps of:
   7. closing said master valve;
   8. closing said at least one chemical valve;
   9. opening said at least one directing valve; and
   10. opening said air valve to send air through said flush pipe and mixing pipe.

* * * * *